Oct. 28, 1969  E. O. KLEINFELDER  3,475,117

FLUIDIZING GAS INTRODUCTION INTO A REACTOR

Filed Nov. 16, 1966

INVENTOR
EARL O. KLEINFELDER

BY

ATTORNEY

United States Patent Office

3,475,117
Patented Oct. 28, 1969

3,475,117
FLUIDIZING GAS INTRODUCTION
INTO A REACTOR
Earl O. Kleinfelder, Antioch, Calif., assignor to E. I. du
Pont de Nemours and Company, Wilmington, Del., a
corporation of Delaware
Filed Nov. 16, 1966, Ser. No. 594,871
Int. Cl. C01g 23/04, 1/00
U.S. Cl. 23—87                                    5 Claims

ABSTRACT OF THE DISCLOSURE

In the operation of a fluidized reaction zone in which, for example, reaction of titanium ore and a reducing agent is carried out using chlorine as the fluidizing gas and in which the fluidizing gas is fed to the reaction zone through a helical serpentine passage, the improvement of concurrently passing fluidizing gas through an unobstructed vertical passage, of a size related to the particle diameter of the fluidized solids, and which is in open communication with the serpentine passage.

---

Figure 1:
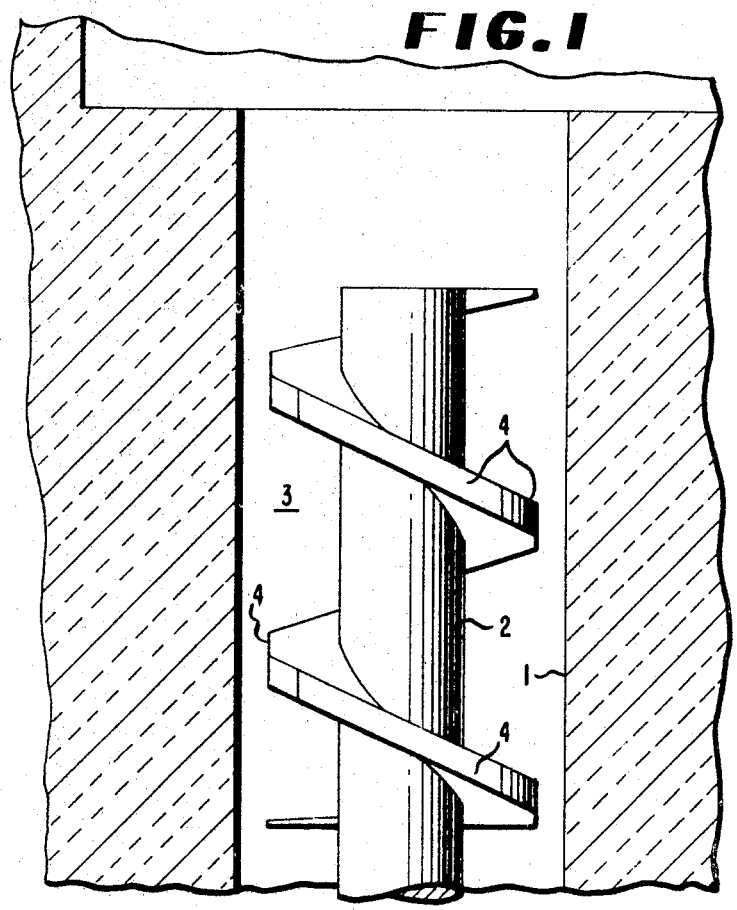

This invention relates to the introduction of a gaseous fluidizing or reactant medium into a fluidization reaction zone. More particularly, it relates to novel methods and means for introducing through improved spiral inlet means gaseous chlorine as a fluidizing and reactant medium into a chlorination vessel whereby a reduced pressure drop across the spiral inlet will be obtained and a decreased back pressure on the chlorination system will prevail.

In U.S. Patent 2,856,264 relating to metal chloride manufacture by fluidization techniques, a fluidizing reactant medium is charged into a fluidized solids reactor through vertical, spiral inlet inserts disposed within a cylindrical conduit. Each insert member is provided with a serpentine helical passage having a helix angle within its lower boundary surface which is less than the effective angle of slide of the solids in the reactor and a cross sectional area smaller than the area of the conduit. These inserts provide helix-shaped throats which serve as constricted orifices for the upward flow of entering fluidizing vapor during periods of reactor operation and prevent fluidized bed solids from settling or flowing into the vertical multiple inlet conduits during periods of cessation of fluidizing gas flow. In one embodiment of the patent gaseous chlorine is charged upwardly into the reactor through said inlets and spirals into a fluidized bed of a finely divided titaniferous material and reaction between the chlorine and titaniferous material is brought about within the reaction vessel in the presence of a carbonaceous reducing agent at temperatures ranging from 850–1300° C., whereby titanium and iron chlorides are produced and in accordance with, for example, the reactions and procedures disclosed in U.S. Patents 2,486,912, 2,701,179 or 2,701,180.

In the chlorination operation, a plurality of fluidizing gas inlet conduits disposed in the base of the chlorinator are usually employed in each of which is disposed a removable corrosion resistant metal or other desired type of spiral insert conforming to that described in U.S. 2,856,264. These inserts are so arranged within the conduit that only a relatively slight clearance, sufficient to permit spiral introduction or removal, will exist between the internal walls of the cylindrical conduit and the outer periphery or boundary of the cylindrical spiral.

In the course of the chlorination operation, a pressure drop across the spiral inserts builds up and to a range of about 12–25 p.s.i. Pressure drops of this magnitude are objectionable because an undesired back pressure increase develops in the system which exerts an adverse effect upon auxiliary equipment, particularly on pump, agitator and compressor seals. In addition, since the clearance between the spiral insert and the conduit wall is relatively small and the fluidizing gas is charged at a relatively high velocity into the chlorinator, an excessive wear on the internal walls of the conduit arises when foreign solid material is present in the fluidizing gas.

It has now been found that these and other difficulties encountered with prior spiral insert use in a fluidized bed halogenation operation can be affectively remedied. A primary and salient object of this invention therefore is to overcome the disadvantages alluded to and to provide novel and effective methods and means for accomplishing that purpose, all of which will be evident from the ensuing description of the invention and from the accompanying drawings wherein, FIG. 1 is a side elevational, partly sectional view of one form of reactor inlet useful in the invention, and FIG. 2 is a top plan view of the spiral and conduit elements shown in FIG. 1.

It has now been found that the difficulties alluded to in employing prior spiral inserts can be effectively remedied through the employment of one or more modified forms of spiral inserts having a partially truncated surface through removal of a limited portion of the outer edges or periphery of the insert so that in use an increased, limited enlargement of the clearance between the edge surface of the spiral and the interior walls of the retaining inlet conduit is brought about. Employment of such modified, truncated spiral in a chlorination operation will be found to advantageously and effectively reduce the pressure drop across the spirals from an undesired 12–25 p.s.i. to a desirable, about 4 p.s.i. while maintaining all advantages which spiral insert use have afforded in a chlorination furnace.

Figure 2:
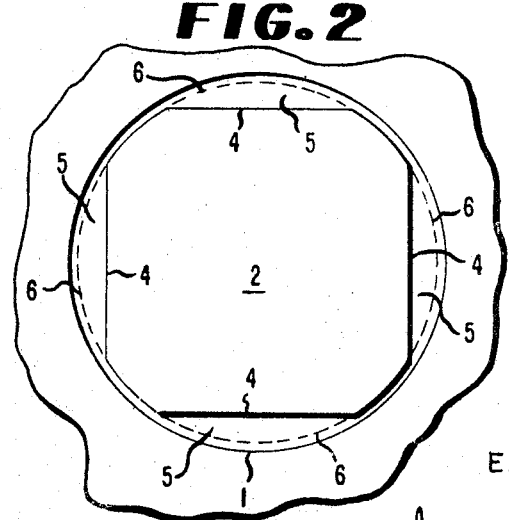

Referring to the drawings wherein like figures refer to like parts throughout, and particularly to FIG. 1, there is shown a vertical, cylindrical inlet conduit 1 adapted to be disposed in the bottom or base portion of a conventional type chlorination reactor such as described in U.S. 2,856,264, and through one or more of which conduits a chlorinating or fluidizing gas can be readily charged at any desired, controlled rate into the interior of the reactor. The latter can consist of a corrosion resistant metal or alloy, internally lined with a ceramic or other refractory material which is resistant and protective against the corrosive action of heat and reactant product gases from a chlorination operation. A separate, valve-controlled inlet can be provided in the upper portion of the reactor through which the material being fluidized and chlorinated, such as a mixture of finely divided titaniferous ore and a carbonaceous reducing agent, can be charged to the furnace reactor at a controlled rate from a source of supply. Alternatively, separate inlets can be provided in the reaction vessel whereby separate introduction of the reading agent and ore can be brought about. A suitable outlet can be provided in the upper portion of the reactor through which gaseous reaction products, such as iron chloride and titanium tetrachloride, evolved in the chlorination can be withdrawn for passage to associated separatory and treating equipment such as a condensing and recovery system.

Adjustably mounted in centered, screw-threaded or other desired relationship within the vertical inlet conduit 1 at or near substantially the point of entrance of said conduit into a reaction chamber (but without attaining access to the interior of said chamber) is a removable, truncated form of spirial or helical insert 2 composed of a corrosive resistant material, preferably a metal or alloy, such as nickel or nickel alloy. The cross sectional area of said insert is less than the internal area of the inlet conduit and the presence of the insert therein provides a helix-shaped throat which functions as a constricted orifice for the upward flow of entering fluidizing and reactant gases through the inlet 1 and into the reaction chamber. The serpentine helical passage 3 of the insert has a helix angle within its lower boundary surface which is less than the effective angle of slide of solids being subjected to fluidization and chlorination within the reaction chamber and prevents undesired settling or back flow of solids into the inlet during periods of cessation of fluidizing gas flow. The spiral 2 is suitably machined, molded or otherwise shaped to present a truncated surface 4 on four of its sides which, as illustrated in FIG. 2, provides an effective increase in the clearance between said truncated surface and the internal wall of the conduit and forms an enlarged, slotted passage area 5 which is in clear contrast to the relatively slight clearance which prior spiral use has provided, as illustrated by the dotted lines 6 appearing in FIG. 2. Up to 30% and preferably up to 15% of the cross-sectional area of the spiral insert is removed or otherwise eliminated from prior forms of spirals in obtaining the slotted passage area 6 of this invention, and the extent of said passage and clearance should not exceed 1.7 times the average particle diameter of the coarse fraction of the solid bed material being fluidized and chlorinated. Preferably, such clearance should be less than 90% of said average diameter of said coarse fraction particles.

To more aptly illustrate the effect which modifying prior forms of spiral inserts induces in the invention, the following is given:

A vertical inlet conduit was selected having an inside diameter of 0.825 inches or a cross sectional area of 0.534 square inches. The spiral insert prior to modification had an outside diameter of 0.790 inches or a cross sectional area of 0.490 square inches. The area of clearance between the insert and the conduit wall comprised the difference between thees two areas:

0.534 sq. in.—0.490 sq. in.=0.044 sq. in.

In the machining operation removal of four sides of the spiral insert was undertaken to eliminate segments having a height ($h$) of 0.0625 inches. The diameter (D) of the spiral insert being 0.790 inches. The cross sectional area of each segment removed from the spiral was calculated by using the formula found in Handbook of Chemistry and Physics 45th ed. page A–167.

$$\text{Area (segment)} = \frac{\pi r^2 \theta}{360} - \frac{r^2 \sin \theta}{2}$$

$\theta$ is the angle between the two radii in degrees. In this case $\theta = 66^\circ$.

Area (segment)=0.0185 sq. in.

Since four of these segments were removed, the total cross sectional area removed from the spiral insert was 0.0185×4=0.0741 sq. in. The percent metal removed by modification is determined by dividing the cross sectional area of the four segments removed by the cross sectional area of the insert before machining or $$\frac{0.074 \text{ sq. in.}}{0.490 \text{ sq. in.}} \times 100 = 15.1\% \text{ removed}$$

The cross sectional area of the modified, or machined spiral is determined by subtracting these two areas or 0.490 sq. in.—0.074 sq. in=0.416 sq. in.

The area of the clearance between the modified spiral and the conduit wall was determined by subtracting the area of the modified spiral from the area of the inlet conduit or 0.534 sq. in.—0.416 sq. in.=0.118 sq. in.

Area of clearance between: Sq. in.
Modified spiral and conduit wall _____ 0.118
Un-modified spiral and conduit wall _____ 0.044

Increase in clearance area (168% increase) ____ 0.074

The novel improved spiral inserts of this invention will advantageously provide substantially twice the open gas flow area which prior spiral inserts have provided. Their use in processes for the fluidized bed chlorination of titaniferous ores such as contemplated in the above mentioned patents will be found effective in overcoming the high manifold pressures experienced in such processes when existing spirals are employed. As previously noted high (12–25 p.s.i.) manifold pressures arise mainly from an excessive pressure drop across the spirals. This excessive pressure drop causes erosion failure of the jet pipes in the spiral area which in turn contributes to reduced chlorinator life, adds to cost for repairs of equipment and increases repair turn around time. In addition, when the $TiCl_4$ product from the chlorination is employed in the manufacture of $TiO_2$ pigments, the high manifold pressure forces the oxidation reactor employed in such manufacture to be operated at varying pressures depending on manifold conditions. Reduced manifold pressure will enable operation of the oxidation reactor at relatively lower pressures and its maintenance at a given pressure between manifold cleanings. By use of the modified inserts of this invention these difficulties are effectively alleviated and the pressure drop across the spiral is effectively reduced from the indicated 12–25 p.s.i. to about 4–5 p.s.i., which is adequate and sufficient for satisfactory gas distribution in the chlorination.

In employing the improved spiral inlets described in the production of, for example, $TiCl_4$, a reactant fluidizing chlorine-containing gas mixture can be charged into a fluidized bed type of reactor from a conventional conduit and manifold system through a plurality of vertical inlet conduits containing the improved spirals. Simultaneously, finely divided (capable of passing +6 mesh U.S. Sieve Series) mixture of about 1 part of a crushed carbonaceous reducing agent such as coke and about 5 parts of a titaniferous material such as ilmenite, rutile, $TiO_2$ concentrates, etc., is fed from storage either continuously or intermittently through a separate inlet into the reactor which previously had been heated to a temperature in excess to about 600° C. and reaction between the chlorine and titaniferous material effected in fluidized bed suspension and at a temperature within a range of from 800–1300° C. Coke is preferably employed as the reducing agent and the proportions of reactants bed can comprise about 5 parts of ore to 1 part of coke. 10% of the coke can be in the coarse fraction having an average particle diameter of 0.12 inch, or 1.5% of the bed as a diameter greater than the clearance specified in the preferred embodiment of the invention. These coke particles in the coarse fraction bridge over the clearance between the spiral insert and the conduit wall or over the slots cut in the spiral flights of the insert during periods when the fluidizing medium is not being charged to the bed. The gaseous feed rate employed is sufficient in velocity to entrain the comminuted solids in fluidized or bubbling state with the reactor and the gaseous products of reaction (mainly $TiCl_4$, $FeCl_3$, $CO_2$ and $CO$) formed in the reaction are withdrawn from the reactor and passed to a cyclone or other separatory equipment for final separation and recovery.

The actual size of the clearance limits of the cross-sectional area of the helix-shaped passage in the spiral inserts will depend upon many factors, including gas flow, reactor operation variables, and the relative dimensions of the inlet conduit and helix, etc. In general, this cross sectional area would be less than ½ that of the inlet conduit and preferably it is of the order of ⅕ of that area.

In the above specific example the inlet conduit has a cross sectional area of 0.534 sq. in. If the cross sectional area of the helix shaped passage is preferred at ⅕ of the area of the conduit, then the cross sectional area of the helix passage will be 0.1068 sq. in. The area of the clearance between the unmodified spiral and the conduit wall was determined as 0.044 sq. in. Thus, the total free area for passage of chlorine gas into the reactor when the unmodified spiral was used would be the sum of these two areas or 0.1528 sq. in. The modified spiral provided with four truncated faces provides a clearance between the unmodified spiral and the conduit wall of 0.118 sq. in. In the instance of modified spiral use, the total free area for passage of the chlorine was 0.1068 sq. in. +0.118 sq. in. Thus, by modifying prior spiral inserts through metal removal from four faces thereof the free area for chlorine passage can be increased by 0.0720 sq. in., whereby a 47% increase in free area is realized.

Measurement of pressure drops across the spiral inserts both before and after modification reveal that unmodified spiral insert measured 12 p.s.i. and in certain instances as high as 25 p.s.i. The pressure drop across the modified spiral insert, where the free cross sectional area had been effectively increased, measured 4 p.s.i. under equal gas flow conditions. The relatively low pressure drop thus effected decreased the back pressure on auxiliary equipment tied in to the chlorine manifold system, and eliminated problems with leaks around pump and agitator seals.

The improved modified spiral inserts of the instant invention still possess the advantages of prior spiral inserts in that they act as constricting orifices; prevent bed solids from flowing into the vertical multiple inlet conduit; are generally self-cleaning; and are removable for ease in replacement. At the same time they overcome the disadvantages of prior spiral inserts, including undesired high pressure drop across the spirals; excessive wear on the conduit wall; and back pressure on auxiliary equipment.

The modified spiral insert can conveniently consist of iron or steel or any other desired metal, although preferably it is composed of corrosion-resistant metal such as nickel or nickel alloys. Where the most corrosive conditions exist it may be fabricated of glass, silica or other ceramic material.

In the preferred embodiment of the invention the improved spirals in use will form slots between the insert and the conduit wall, with said slots not exceeding 90% of the average particle diameter of the coarse fraction of the bed material, at their widest point. Also there will form a helix shaped passage having a helix angle of about 25° at its lower boundary surface which is less than the effective angle of slide of the solids being fluidized within the reactor. The number of turns in the helix should be sufficient so that the surface of solids in repose will intersect the upper and lower boundaries of the helix.

As a modification, the conduit wall can be provided with square-threaded rifling-like grooves, which form with a removable cylindrical plug a helical-shaped passage. The cylindrical plug can have metal removed from four sides of the cylinder so that the plug will remain centered in the conduit and at the same time the free area or clearance will be large enough to prevent a high pressure drop across the charging apparatus, or cylindrical plug. As in the preferred example, said clearance should not exceed 90% of the average particle diameter of the coarse fraction of the bed material.

The improved spiral inserts of this invention can be employed in any process wherein a vapor is to be brought into contact with finely divided or granular solids and are particularly useful in processes in which finely divided solids are fluidized by suspension in a gas. While most useful in the case of multiple vapor inlet processes, the apparatus of the invention is also useful in a process requiring only one vapor inlet, positioned, for example, at the apex of a funnel-shaped bottom of a reactor in which gas-suspended solids are required.

When removing a modified spiral insert for cleaning, replacement, or other reason, during a period in which fluidizing gas has been cut off and the bed solids have settled down on the floor of the fluidizing chamber, a temporary disposable plug can be inserted into the fluidizing gas inlet conduit to retain the solids within the fluidizing chamber while the necessary servicing of the removable insert is being performed.

The effective angle of slide is the maximum inclination of a surface with the horizontal which allows solids to slide freely down an inclined surface and is a function of the characteristics of the inclined surface and material being retained, and in general is slightly less than the effective angle of repose.

The effective angle of repose of the granular solids is the inclination of a slant height of a cone of finely piled solids with the horizontal.

I claim:
1. In a process for fluidizing and reacting a plurality of finely divided solids with a reactant gas at an elevated temperature in a reaction zone wherein said solids are maintained in fluidized suspension by charging said gas upwardly into said zone through an inlet conduit consisting essentially of a helical, serpentine passage, the improvement which comprises concurrently therewith charging the gas directly through at least one associated unobstructed vertical passage within said vertical inlet conduit which vertical passage is in open communication with said serpentine passage, the said unobstructed associated vertical passage constituting a substantial portion up to 30% of the horizontal cross-sectional area of said vertical inlet conduit, and said unobstructed vertical passage being formed by partially truncating a helical insert that resides within said vertical inlet conduit, said helical insert and inlet conduit being of corrosion resistant material.

2. A process in accordance with claim 1 in which the fluidized solids bed comprises a mixture of a titaniferous material and a carbonaceous reducing agent, and the reactant and fluidizing gas is chlorine.

3. A process in accordance with claim 2 in which the fluidized solids bed comprises a mixture of ilmenite and coke.

4. A process in accordance with claim 1 in which the fluidizing and reactant gas passes upwardly into the reaction zone through an inlet combination consisting of a vertically disposed helical passage having a helix angle within its lower boundary surface which is less than the effective angle of slide of the solids in the fluidized suspension and contains helical turns sufficient for the surface of solids in repose therein to intersect the upper and lower boundaries thereof, and at least one substantially straight direct vertical passage which is in open communication with the said helical passage.

5. The process of claim 4 in which the fluidized solids bed suspension comprises a mixture of a finely divided titaniferous material and carbonaceous reducing agent, the reactant and fluidizing gas is chlorine, the direct, vertical passage maintained in open communication with the serpentine passage is adjacent to the periphery of the helical passage, and said direct vertical passage has such horizontal cross-sectional dimensions that the largest 1.5% by weight of the finely divided particles can not freely pass downwardly therethrough.

References Cited

UNITED STATES PATENTS 2,856,264 10/1958 Dunn _____ 23—87
3,086,843 4/1963 Evans et al. _____ 23—87

EDWARD STERN, Primary Examiner

U.S. Cl. X.R.

23—1, 202